No. 853,458. PATENTED MAY 14, 1907.
C. B. HYSOM.
FRUIT PICKER.
APPLICATION FILED DEC. 21, 1905.
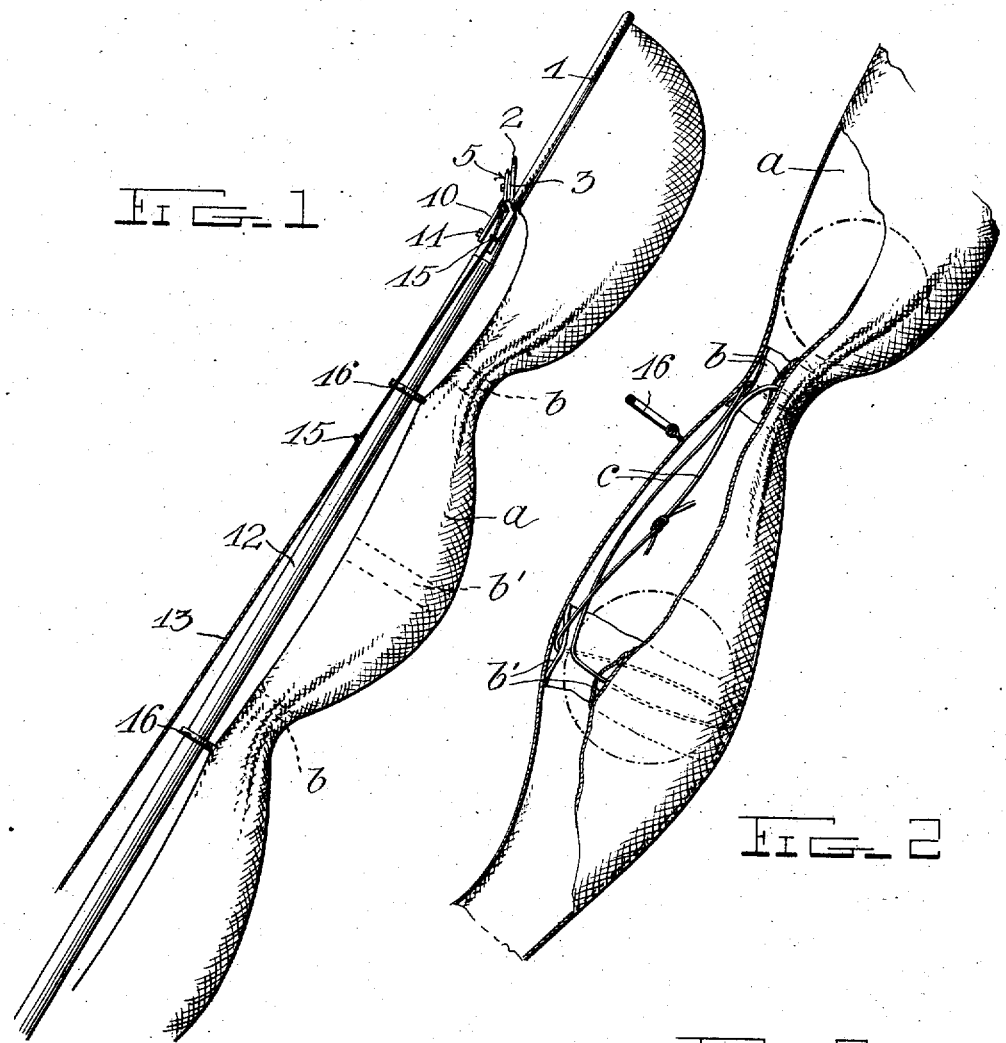
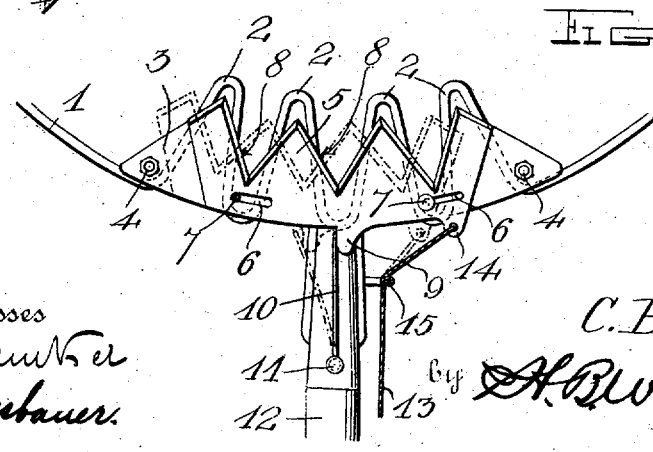
Witnesses
C. Mun N. er
C. W. Griesbauer
Inventor
C. B. Hysom
by H. B. Willson
Attorney
THE NORRIS PETERS CO., WASHINGTON, D.C.

UNITED STATES PATENT OFFICE.

CORNELIUS B. HYSOM, OF EVERETT, WASHINGTON.

FRUIT-PICKER.

No. 853,458.     Specification of Letters Patent.     Patented May 14, 1907.

Application filed December 21, 1905. Serial No. 292,822.

*To all whom it may concern:*

Be it known that I, CORNELIUS B. HYSOM, a citizen of the United States, residing at Everett, in the county of Snohomish and State of Washington, have invented certain new and useful Improvements in Fruit-Pickers; and I do declare the following to be a full, clear, and exact description of the invention, such as will enable others skilled in the art to which it appertains to make and use the same.

This invention relates to fruit pickers, and the principal object of the same is to provide improved means for severing the stems of the fruit and for dropping the fruit into a fabric chute having means for automatically contracting the opening therein at intervals to retard the fruit and to permit it to pass the contracted portion and fall to another contracted portion, the means for contracting the chute being operated automatically.

Another object is to provide a reciprocating cutter bar for severing the stems of the fruit, said cutter bar being actuated in one direction by a spring and in the other direction by an operating cord.

Another object is to provide automatic means for permitting the fruit to pass singly down the chute and be arrested at various points to prevent contact of the fruit until it reaches its destination below the tree.

These and other objects are attained by means of the construction illustrated in the accompanying drawings, in which,—

Figure 1 is a side elevation of the upper end of a fruit picker, made in accordance with my invention; Fig. 2 is a sectional view of the chute and showing the manner in which the chute is contracted and expanded alternately by the weight of the fruit; and Fig. 3 is a detail plan view of the reciprocating cutter.

Referring to the drawing for a more particular description of my invention, the numeral 1 designates a wire ring, forming the mouth of the picker, said ring at a point within the handle portion being provided with corrugations or zigzag loops 2 to form gathering fingers to guide the stems of the fruit to a cutter bar, and to protect the fruit from the cutting device. The cutter is composed of a stationary blade 3, secured to the ring in any suitable manner, as by rivets 4. The stationary cutter is provided with V-shaped openings, disposed centrally of the guide fingers. A reciprocating cutter 5, provided with slots 6 and rivets or screws 7 to permit it to reciprocate upon the cutter, is provided with similar V-shaped cutting edges 8 and with a lug 9 projecting toward the handle portion of the device. A spring 10, secured to a handle 12, at 11, projects in line with the handle and bears against the lug 9 to move the reciprocating cutter bar toward the right in Fig. 3. To reciprocate the cutter a flexible connection 13 is attached to a lug 14 upon the reciprocating bar 5, and led through a series of staples 15, secured to the handle 12.

The flexible chute $a$ consists of a fabric tube of the usual or any suitable construction, and provided at intervals with annular pockets $b$ for the draw cords $c$. These draw cords are endless and are passed around within the pocket $b$ and extend thence down to a similar pocket $b'$ and passed around in said pocket, as shown in Fig. 2. Any suitable number of these retarding devices may be used. As shown in Fig. 1, it will be seen that when the upper member of the retarding device is retracted, the lower member is expanded and vice versa, so that as the fruit drops upon the upper contracted portion of the retarder, the chute is opened at this point by the weight of the fruit, the opening of this portion contracting the cord in the pocket $b'$, so as to permit the fruit to fall but a short distance, and singly, so that one will not fall upon another and thus bruise the fruit. It will be understood that any number of these retarding devices, arranged one above the other, will permit the fruit to drop in gradual step-by-step intervals until it is deposited at the bottom.

The operation of the cutter may be described as follows: The handle 12 is connected to the chute by means of the rings 16. The cutter bar extends at a slight angle to the handle, as shown in Fig. 1, and as the mouth of the picker is held under the fruit, the cord 13 is pulled to sever the stem and permit the fruit to drop into the mouth, as will be understood.

Having thus described my invention, what I claim as new and desire to secure by Letters-Patent, is,—

1. A fruit picker having a tubular flexible chute, an endless cord having a portion disposed longitudinally of the chute and other portions forming open loops separated by said longitudinal portion and disposed transversely with reference and slidably connected to the chute, so that when one of said open loops is enlarged by the passage of an object therethrough, the other will be automatically contracted and caused to correspondingly contract the portion of the chute to which it is slidably connected, for the purpose set forth.

2. A fruit picker having a mouth ring having a portion thereof bent reversely to form gathering fingers, a fixed cutter plate partially covering said fingers, a movable cutter plate mounted to reciprocate on said fixed cutter plate, a spring to move said movable cutter plate in one direction, a cord to move it in the reverse direction, and a direction element for said cord, substantially as described.

In testimony whereof I have hereunto set my hand in presence of two subscribing witnesses.

CORNELIUS B. HYSOM.

Witnesses:
ANNIE M. HARRIMAN,
RICHARD A. CURTIN.